April 20, 1954
R. PALAZZOLO
2,676,311
AUTOMOBILE SIGNAL APPARATUS
Filed Aug. 7, 1952
FIG. 1
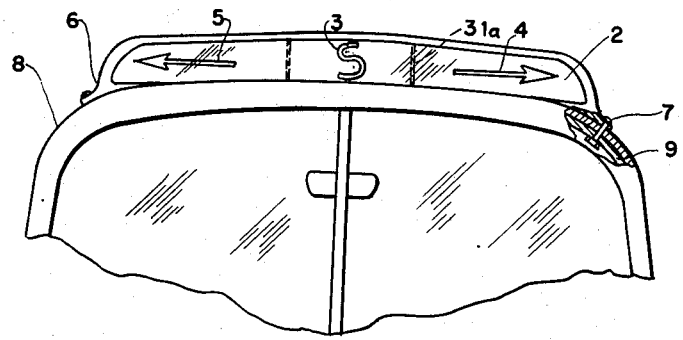
FIG. 2
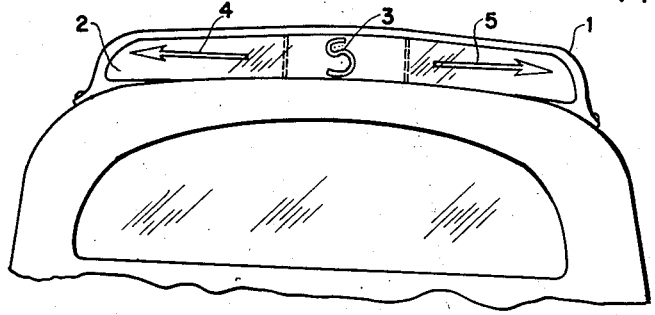
FIG. 4
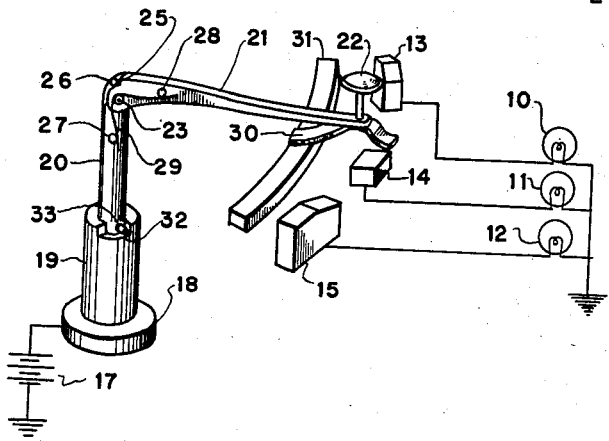
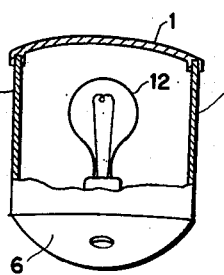
FIG. 3
INVENTOR.
Rosario Palazzola
BY
William F. Nickel
ATTORNEY

Patented Apr. 20, 1954

2,676,311

UNITED STATES PATENT OFFICE 2,676,311

AUTOMOBILE SIGNAL APPARATUS

Rosario Palazzolo, Bronx, N. Y.

Application August 7, 1952, Serial No. 303,047

1 Claim. (Cl. 340—74)

My invention is an improved indicator for installation on taxicabs and other motor vehicles to signal intended changes in the motion of the vehicle, such as slowing, stopping and the direction of travel, and thus give timely warning to the operator of other vehicles and pedestrians close at hand, so that loss of life and injuries to persons and property can be prevented.

An object of this invention is to provide indicating or annunciating apparatus adapted to be mounted on a motor vehicle in a place where it will be most conspicuous and clearly visible in its entirety from both the front and back of the vehicle, so that it cannot fail to be seen by everyone in the immediate vicinity. To this end, the indicator comprises an elongated casing affixed to the top of the vehicle in transverse position, and preferably extending from side to side thereof, carrying indications facing to both the front and rear; and having means for causing said indications to make known to all observers what the driver of the vehicle wishes to do in the next moment.

Another object is to provide such an annunciator or indicator that is simple and practical and capable of being attached to any conventional motor vehicle without requiring any change in the construction, or interfering at all with the operation of any of its accessories or necessary parts.

The nature and other objects and advantages of the improvement are clearly described herein and a preferred form of the indicating apparatus is illustrated in the drawings. But I do not wish to be limited to the exact structure shown, for changes in minor respects may be adopted without deviation from the general plan in which the invention resides.

On said drawings:

Figure 1 is a front view of an indicator casing mounted on top of the body of a motor vehicle.

Figure 2 is a rear view of what appears on Figure 1.

Figure 3 is an end elevation of the casing; and

Figure 4 shows diagrammatically how the apparatus is operated.

The numeral 1 indicates a casing having windows 2, of glass or other light-transmitting material, at the front and rear. Each of these windows bears the letter S in the middle and an arrow 4 near one end and an arrow 5 near the other. These arrows point in opposite directions. The casing is closed at the top and ends and the ends have projections 6 at their lower edges, with openings for screws or bolts 7, so that the casing can be secured in place on the outer surface of the roof 8 of an automobile or other motor vehicle as shown. To attach the casing the top 8 of the automobile can be pierced with openings and threaded bores worked in the ends of one of the cross bars 9 of the frame work of the car, just under the top. The indications 3, 4 and 5 therefore are seen from both the front and rear of the car; and the casing is long enough to extend substantially over the entire width of the car and high enough for the indications to be of large size. Hence the signals can be conspicuous enough to be observed by everybody in the vicinity of the vehicle.

The windows 2 can be of light-transmitting material with the signals of opaque material or the windows can be opaque and the signals light-transmitting; and the casing and signals are large enough so that the signals are very noticeable when they are used. The signals of the middle pair 3 are identical, and so are the indications of the pairs 4 and 5. Within the casing are lamps 10, 11 and 12 one between each pair of duplicate signals on the windows 2. When the middle lamp is illuminated the middle signals 3 become very noticeable and warn everybody that the driver wants to slow down or stop. When one of the other lamps is illuminated it gives everybody warning that a turn to one hand or the other is about to be made. The signals may also transmit some light to show brightly whenever a lamp is illuminated.

The lamps illuminating members 10, 11 and 12 are controlled by selector means inside the car within reach of the driver, so that any one of the lamps may be energized as desired. Such means are indicated on Figure 4, which shows a circuit and switching means for controlling the circuit, and a source of electricity, such as a battery 17, which may be the battery for lighting the car, is included in the circuit. An insulating base 18 supports a bearing 19 which receives one end of a rotatable stud 20. To this stud carries a pivoted arm 21, on the outer end of which is a knob 22 the pivot pin connecting the arm 21 to the stud 20 being indicated at 23. The arm 21 has a shoulder 25 near the pin 23 and at the top the stud 20 has a stop 26 engaged by the shoulder. The stud 20 also has a pin or projection 27 below the pivot pin 23 and the arm 21 has a stud or projection 28 in the side thereof near the pin 23. A bent spring 29 makes contact with the pivot pin 23 at the center and engages the projections 27 and 28 so that the arm 21 is normally held with its shoulder 23 against the pin 25.

On the outer end of the arm which may be of metal is a leaf spring terminal 30 and below the arm of any suitable support are terminals 13, 14 and 15 connected to the lamps 10, 11 and 12 respectively. The terminals 13 and 15 are higher than the middle terminal 14. The lamps 10, 11 and 12 are grounded and so is the low voltage or negative pole of the battery 17. The other pole is connected to the arc-shaped terminal 31 under the arm 21 and long enough for the spring 30 to be in contact with it when the spring 30 engages any one of the terminals 13, 14 and 15; the rear end of the spring 30 being bent down lower than the front end which makes contact with the terminals 13, 14 and 15.

Hence the operator of the vehicle merely by depressing the arm 21 can make contact with the middle terminal 14, and thus causes the middle lamp 14 lights up; by throwing the arm 21 to the right or the left the spring terminal 30 engages with one of the terminals 13 or 15 and causes the other lamps to light up and direct attention to either one of the pairs of arrows 4 or 5.

The casing has opaque inside partitions 31a between the middle lamp and the other lamps to ensure only the illumination of one pair of signals at a time. Also the upper end of the bearing 19 has a recess 32 and the stud 20 a step 33 in said recess to hold the switch within the range of the terminals 13, 14 and 15.

I do not wish to be limited to three lamps only, as more than one lamp can be used in conjunction with each signal if desired.

Having described my invention, what I believe to be new is:

An annunciator for giving a visible advance signal of a change of motion in the travel of a motor vehicle, comprising a casing having front and rear sides of light transmitting material, said casing being disposed on the outside of the roof of the vehicle and extending across said roof, the casing having projections at its ends near its bottom, fastening means in said projections to secure the casing in place on said roof, said front rear sides each bearing an indication adjacent the middle, said pair of indications being identical; and likewise each bearing an indication near each end of the casing, each pair of indications near an end also being identical, an illuminating member between each pair of identical indications in said casing, an electric circuit including a source of electrcal energy for said members, and selective means in said circuit to enable the operator of the vehicle to close said circuit through any one of said members to make any of said pairs of indications clearly visible at the front and rear of the vehicle, said selective means comprising three terminals placed end to end in a row, one connected to each illuminating member, the middle member being lower than the other two, a long terminal extending from end to end of said row, a rotatable and depressible arm in said circuit and a resilient terminal carried by said arm to connect either of the terminals in said row to the long terminal.

References Cited in the file of this patent
UNITED STATES PATENTS

| Number | Name | Date |
|---|---|---|
| 1,972,090 | Getty | Sept. 4, 1934 |
| 2,106,643 | Mellen et al. | Jan. 25, 1938 |
| 2,336,905 | Weish | Dec. 14, 1943 |
| 2,486,476 | Kelley | Nov. 1, 1949 |